US012496539B2

(12) United States Patent
Verdegan et al.

(10) Patent No.: US 12,496,539 B2
(45) Date of Patent: Dec. 16, 2025

(54) FILTER ELEMENT WITH SELF-CONTAINED ELECTROSTATIC BUILDUP PROTECTION

(71) Applicant: Cummins Filtration IP, Inc., Columbus, IN (US)

(72) Inventors: Barry Mark Verdegan, Stoughton, WI (US); Justin Miles, Florissant, CO (US); Venkata Sai Abhinav Ademmagari, West Lafayette, IN (US); Peter K. Herman, Stoughton, WI (US); Mark A. Herioux, Columbus, WI (US); Terry W. Shults, Cookeville, TN (US)

(73) Assignee: ATMUS FILTRATION IP INC., Nashville, TN (US)

( * ) Notice: Subject to any disclaimer, the term of this patent is extended or adjusted under 35 U.S.C. 154(b) by 689 days.

(21) Appl. No.: 17/697,097

(22) Filed: Mar. 17, 2022

(65) Prior Publication Data

US 2022/0203269 A1 Jun. 30, 2022

Related U.S. Application Data

(63) Continuation of application No. PCT/US2020/050355, filed on Sep. 11, 2020.
(Continued)

(51) Int. Cl.
*B01D 27/08* (2006.01)
*B01D 27/06* (2006.01)
(Continued)

(52) U.S. Cl.
CPC .............. *B01D 27/08* (2013.01); *B01D 27/06* (2013.01); *B01D 35/30* (2013.01); *B01D 39/1623* (2013.01); *B01D 2201/50* (2013.01)

(58) Field of Classification Search
CPC ........ B01D 27/08; B01D 27/06; B01D 35/30; B01D 39/1623; B01D 2201/50; B01D 2239/0241; B01D 39/10
(Continued)

(56) References Cited

U.S. PATENT DOCUMENTS 3,933,643 A 1/1976 Colvin et al.
5,066,931 A 11/1991 Thelissen
(Continued)

FOREIGN PATENT DOCUMENTS

CN 1886199 A 12/2006
DE 38 18 595 A1 12/1989
(Continued)

OTHER PUBLICATIONS

International Search Report & Written Opinion for PCT/US2020/050355 dated Dec. 21, 2020, 9 pages.
(Continued)

*Primary Examiner* — Madeline Gonzalez
(74) *Attorney, Agent, or Firm* — Foley & Lardner LLP

(57) ABSTRACT

One embodiment relates to a filtration system. The filtration system includes a filter housing and a filter element. The filter housing defines a central cavity. The filter element is disposed within the central cavity. The filter element includes a first endcap, a second endcap, and filter media. The second endcap is disposed axially away from the first endcap. The filter media extends axially between the first endcap and the second endcap. The filter media includes a filter media surface. A support element is in contact with the filter media. The support element is conductive. A first pole is along a surface of support element the filter media. The first pole has a first charge. A second pole is downstream of the first pole. The second pole has a second charge. The first charge is opposite in charge to the second charge.

9 Claims, 7 Drawing Sheets

Related U.S. Application Data

(60) Provisional application No. 62/903,395, filed on Sep. 20, 2019.

(51) Int. Cl.
*B01D 35/30* (2006.01)
*B01D 39/16* (2006.01)

(58) Field of Classification Search
USPC .................. 210/243, 437, 440–444, 457
See application file for complete search history.

(56) References Cited

U.S. PATENT DOCUMENTS

| | | |
|---|---|---|
| 8,932,464 B2 | 1/2015 | Byrd |
| 9,108,128 B2 | 8/2015 | Schmitz et al. |
| 9,839,868 B2 | 12/2017 | Fritze |
| 2003/0057146 A1 | 3/2003 | Rickle et al. |
| 2013/0248435 A1 | 9/2013 | Byrd |
| 2014/0183120 A1* | 7/2014 | Schmitz ............... B01D 35/005 210/243 |

FOREIGN PATENT DOCUMENTS

| | | |
|---|---|---|
| FR | 2812822 A1 | 2/2002 |
| WO | WO-97/03744 A1 | 2/1997 |
| WO | WO-2004/009215 A1 | 1/2004 |
| WO | WO-2019/156688 A1 | 8/2019 |

OTHER PUBLICATIONS

Extended European Search Report issued for European Patent Application No. 20866704.8 issued Sep. 28, 2023, 7 pages.
First Office Action issued for Chinese Patent Application No. 202080063715.5 issued Nov. 23, 2022, 9 pages.

* cited by examiner

FILTER ELEMENT WITH SELF-CONTAINED ELECTROSTATIC BUILDUP PROTECTION

CROSS-REFERENCE TO RELATED PATENT APPLICATIONS

The present application is a continuation of PCT Application No. PCT/US2020/050355, filed Sep. 11, 2020, which claims priority to and benefit of U.S. Provisional Application No. 62/903,395, filed Sep. 20, 2019, and entitled "Filter Element With Self-Contained Electrostatic Buildup Protection." The contents of these applications are hereby incorporated by reference herein.

TECHNICAL FIELD

The present disclosure relates generally to filtration systems having a replaceable filter element.

BACKGROUND

Internal combustion engines generally combust a mixture of fuel (e.g., gasoline, diesel, natural gas, etc.) and air. Prior to entering the engine, fluids, such as fuel and oil, are normally passed through filter elements to remove contaminants (e.g., particulates, dust, water, etc.) from the fluids prior to delivery to the engine. Historically, metal housings (e.g., shells), metal endcaps, metal nutplates, metal centertubes, and/or metal filter heads have been used in filtration systems. However, due to increased costs with implementing metal components, environmental considerations using metal components, and manufacturing metal components filtration systems, many current filtration systems have implemented plastic components in place of metal components.

A potential drawback of the use of plastic is the tendency of the plastic components to accumulate electrostatic charge when used with flowing low conductivity fluids (e.g., petroleum-based oil, fuels, etc.). The voltage buildup gives rise to static discharge as the result of the physical separation of positive and negative charge. Discharge occurs when the voltage exceeds the dielectric breakdown strength of the material separating the positive and negative charges and occurs at the path offering the least resistance. The discharge of this static electricity has the potential to damage plastic parts. For example, electrostatic discharge (ESD) can cause holes to be burned through filter media, housings and plastic components. The ESD may produce sparking degrading the working fluids and may cause safety issues under certain conditions. These engine and filtration systems are therefore susceptible to damage if used with an improper filter element or replacement filter element.

SUMMARY

One embodiment relates to a filtration system. The filtration system includes a filter housing and a filter element. The filter housing defines a central cavity. The filter element is disposed within the central cavity. The filter element includes a first endcap, a second endcap, and filter media. The second endcap is disposed axially away from the first endcap. The filter media extends axially between the first endcap and the second endcap. The filter media includes a filter media surface. A support element is in contact with the filter media. The support element is conductive. A first pole is along a surface of the filter media. The first pole has a first charge. A second pole is downstream of the first pole. The second pole has a second charge. The first charge is opposite in charge to the second charge. The support element and the surface of the filter media form an electrical circuit between the first pole and the second pole.

Another embodiment relates to a filter element. The filter element includes a first endcap, a second endcap, and filter media. The second endcap is disposed axially away from the first endcap. The filter media extends axially between the first endcap and the second endcap. The filter media includes a filter media surface. A central opening is defined within the filter media. The central opening is disposed radially inward from the filter media surface. A centertube is disposed within the central opening. The centertube is in contact with the filter media. The centertube is conductive. A first pole is along a surface of the filter media. The first pole has a first charge. A second pole is downstream of the first pole. The second pole has a second charge. The first charge is opposite in charge to the second charge. The centertube and the surface of the filter media form an electrical circuit between the first pole and the second pole.

Another embodiment relates to a filter element. The filter element includes a first endcap, a second endcap, and filter media. The second endcap is disposed axially away from the first endcap. The filter media extends axially between the first endcap and the second endcap. The filter media includes a filter media surface. A central opening is defined within the filter media. The central opening is disposed radially inward from the filter media surface. A centertube is disposed within the central opening. The centertube is conductive. A conductive mesh is disposed within the central opening between the centertube and the filter media. The conductive mesh is in contact with the centertube and the filter media. A first pole is along a surface of the filter media. The first pole has a first charge. A second pole is downstream of the first pole. The second pole has a second charge. The first charge is opposite in charge to the second charge. The conductive mesh, the centertube, and the surface of the filter media form an electrical circuit between the first pole and the second pole.

These and other features, together with the organization and manner of operation thereof, will become apparent from the following detailed description when taken in conjunction with the accompanying drawings.

DETAILED DESCRIPTION

Figure 1:
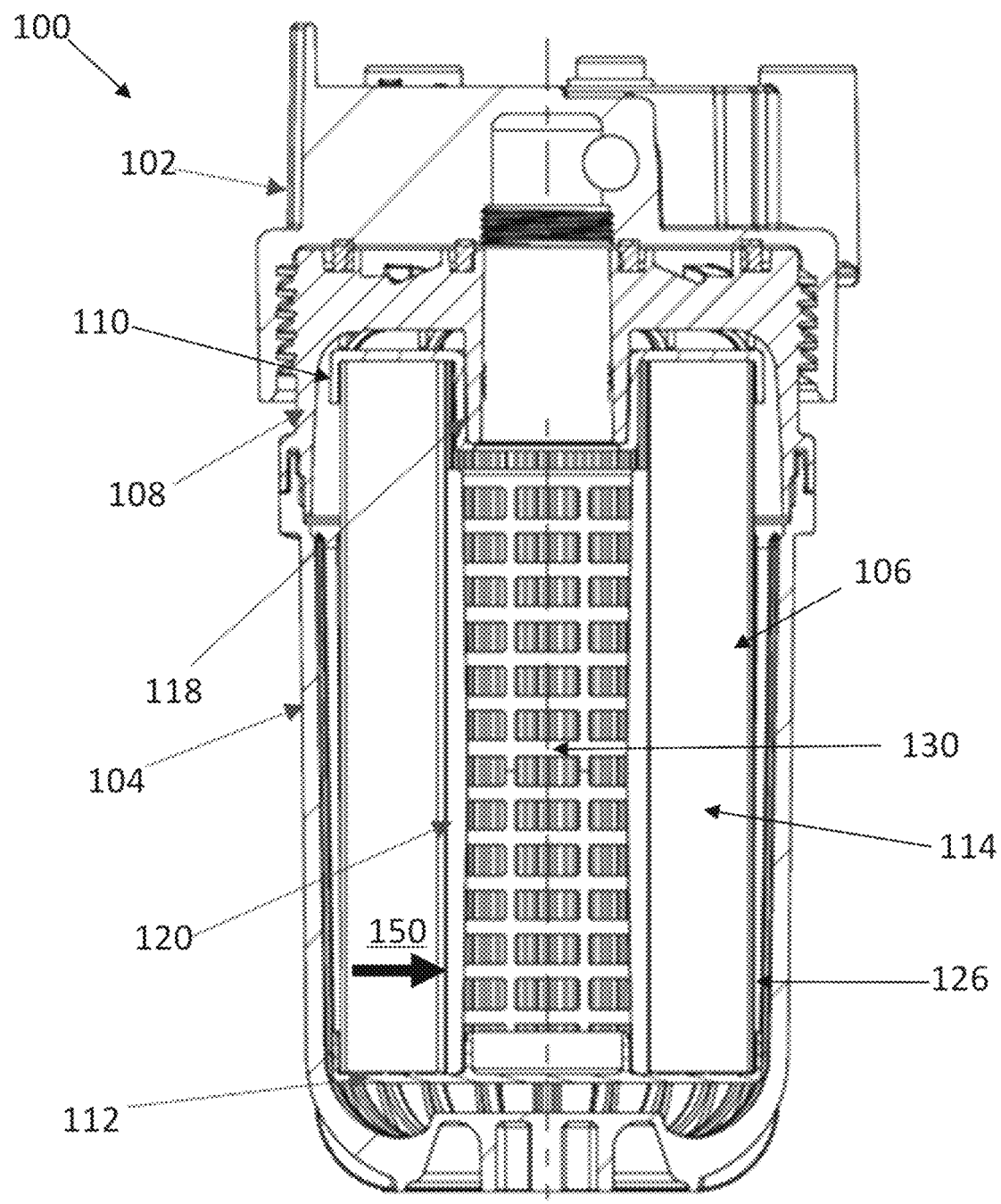
FIG. 1 is a cross-sectional view of a traditional filtration system, according to an example embodiment.

Voltage buildup and damaging discharge is problematic for plastic filter housings, especially when the plastic components are used with low conductivity synthetic filter media to filter low conductivity fluids at high flow rate, low temperature, or low humidity applications. Existing approaches to address this issue include altering the filtration systems to: utilize more expensive metal components, which increases costs; ground the filter to the chassis, which adds cost and complexity to the filter assembly; and use electrically conductive filter media, which tends to be more expensive and may not provide the required filter performance for demanding applications.

Embodiments described herein relate generally to a filtration system and method that includes plastic components and electrostatic discharge control (e.g., buildup protection) contained within the filter element. Generally, the embodiments reduce voltage at the source by utilizing an internal electrical circuit (e.g., electrical conduit) within the filter element that allows for the charge to return and to diminish potential charge buildup and discharge. In some embodiments, an electrode is at the surface of the filter media allowing for greater surface conductivity compared to the fluid and/or internal filter media due to the adsorption of ionic species at the surface. In some embodiments, another electrode is positioned downstream of the surface of the filter media. In some embodiments, the positively charged and negatively charged regions (e.g., poles) are electrically connected by disposing a conductive material between the surface of the filter media and to one or more locations downstream of the filter media. In some embodiments, the filtration system is electrically isolated from the chassis such that the chassis does not provide an electrical ground to the filtration system. In embodiments where the filtration system is in electrical communication with the chassis, the filtration system provides an additional grounding component (e.g., a backup ground) in addition to the chassis. For example, one or more components in the filtration system may have low resistivity (e.g., high conductivity) less than $10^5$ $\Omega \cdot m$. In some embodiments, the filtration system includes filter elements and/or a centertube with a resistivity between $10^{-8}$ to $10^{-5}$ $\Omega \cdot m$.

As used herein, the term "conductive" refers to an electrically conductive material. As used herein, and the term "chassis ground" refers to the discharge of charge build up by establishing an electrical pathway between the charge and ground external to the filter element. In current filtrations systems, the filter element and/or filter cartridge is electrically connected to the chassis or engine of a vehicle to establish a chassis ground. As used herein, the term "local ground" refers to the discharge of charge build up by establishing an electrical pathway between oppositely charged regions within the filter element.

Turning to FIG. 1, an example conventional filtration system 100 implementing conductive, metal components is shown. The filtration system 100 includes a metal filter head 102, a metal housing 104, a metal nutplate 108, and a filter element 106 disposed within a cavity of the metal housing 104. The metal filter head 102 is threadingly engaged to the metal nutplate 108. The filter element 106 includes a metal first endcap 110, a metal second endcap 112, filter media 114, and a metal centertube 120. In some embodiments, the centertube 120 is a conductive support element and possess a variety of different cross-sectional shapes (e.g., rectangular, elliptical, square, etc.). In some embodiments, the filtration system 100 includes a flat, rectangular filter media such that the support element is not disposed within a central opening. In those embodiments, the support element is conductive and in contact with the filter media. In other embodiments, the support element is disposed within an internal opening of the flat, rectangular filter media that extends from an end of the filter media to an opposite end of the filter media. The metal second endcap 112 is disposed axially away from the metal first endcap 110. The filter media 114 extends axially between the metal first endcap 110 and the metal second endcap 112. The filter media 114 includes a filter media surface 126 and a central portion 130 disposed radially inward from and downstream of the filter media surface 126. As used herein, "filter media surface" refers to the surfaces of the filter media fibers that form the filter media 114. The metal centertube 120 is disposed within the central portion 130 of the filter media 114. In an outside-in filtration configuration, the fluid flows 150 through the filter media surface 126 toward the metal centertube 120. The metal nutplate 108 is configured to form a seal 118 with the metal first endcap 110.

ESD is caused by a buildup of voltage due to the physical separation of positive and negative charges between the filter media surface 126 and downstream of the surface of the filter media. As will be appreciated, in the absence of flow 150, ESD does not occur as the inherent surface charge on the filter media surface 126 is neutralized by counterions in the electrical double layer adjacent to the filter media surface 126. Under flow 150 conditions, however, the counterions are swept downstream from the filter media surface 126 resulting in a localized charge imbalance. The physical separation of positive and negative charges creates a buildup of electrostatic charge. An electrical circuit is created and ESD occurs when the voltage exceeds the dielectric breakdown strength of the material separating the electrical charges at a point in the system. The filtration system 100 is configured to address ESD by using the conductive (e.g., metal) outer and inner filter components creating a direct path to the ground chassis through the metal filter head 102. Grounding effectively prevents electrical charge from building up within the filter and ESD.

The electrostatic buildup due to the charge separation is an electrokinetic phenomenon known as streaming potential—when referring to voltage buildup—or streaming current—when referring to resulting current flow. The conductivity is the effective conductivity between the opposing charges, and includes contributions due to the transport of charge (e.g., ions) through the liquid, bulk solids, and along the surfaces. The streaming potential ϕ (V), which is the magnitude of voltage generated, can be calculated by the Helmholtz-Smoluchowski equation. In the equation the streaming potential is equal to the product of the pressure drop (P), dielectric constant of the liquid (ε), electrical permittivity of vacuum ($\varepsilon_0$), and the zeta potential of the surface in the liquid (ζ), divided by the product of dynamic viscosity (η) and electrical conductivity (k). As shown below, the electrical permittivity of vacuum is in $F \cdot m^{-1}$, the zeta potential is in V, the dynamic viscosity of the liquid is in $kg \cdot m^{-1} \cdot s^{-1}$, and the electrical conductivity is in $S \cdot m^{-1}$. The Helmholtz-Smoluchowski equation is:

$$\phi = \frac{P \varepsilon \varepsilon_0 \zeta}{\eta k}$$

The Helmholtz-Smoluchowski equation shows that ESD is more problematic (e.g., likely to occur) in hydrocarbon applications when the filter pressure drop is high (e.g., high flow rate, high viscosity liquid or low temperature), the magnitude of zeta potential is high, or the conductivity is low (e.g., low temperature and high viscosity reduce conductivity). ESD is more likely to occur in dry (e.g., low humidity and/or, cold temperatures) environments, as the liquid will typically contain less water—which increases conductivity—and higher voltages can build up prior to discharge. As previously noted, there is increased use of plastic components in filtration, engines, and other mechanical systems. As contaminant removal requirements become more demanding, the applications of plastic components require tighter filter media with higher pressure drops. Further, polymeric filter media (e.g., polyamides, polyesters, halocarbons, etc.) are increasingly being used for these applications, which tend to exhibit higher zeta potential than traditional filter media and are less conductive. For these reasons, there is increased interest in preventing ESD in a practical, cost-effective manner.

Figures 2A, 2B:
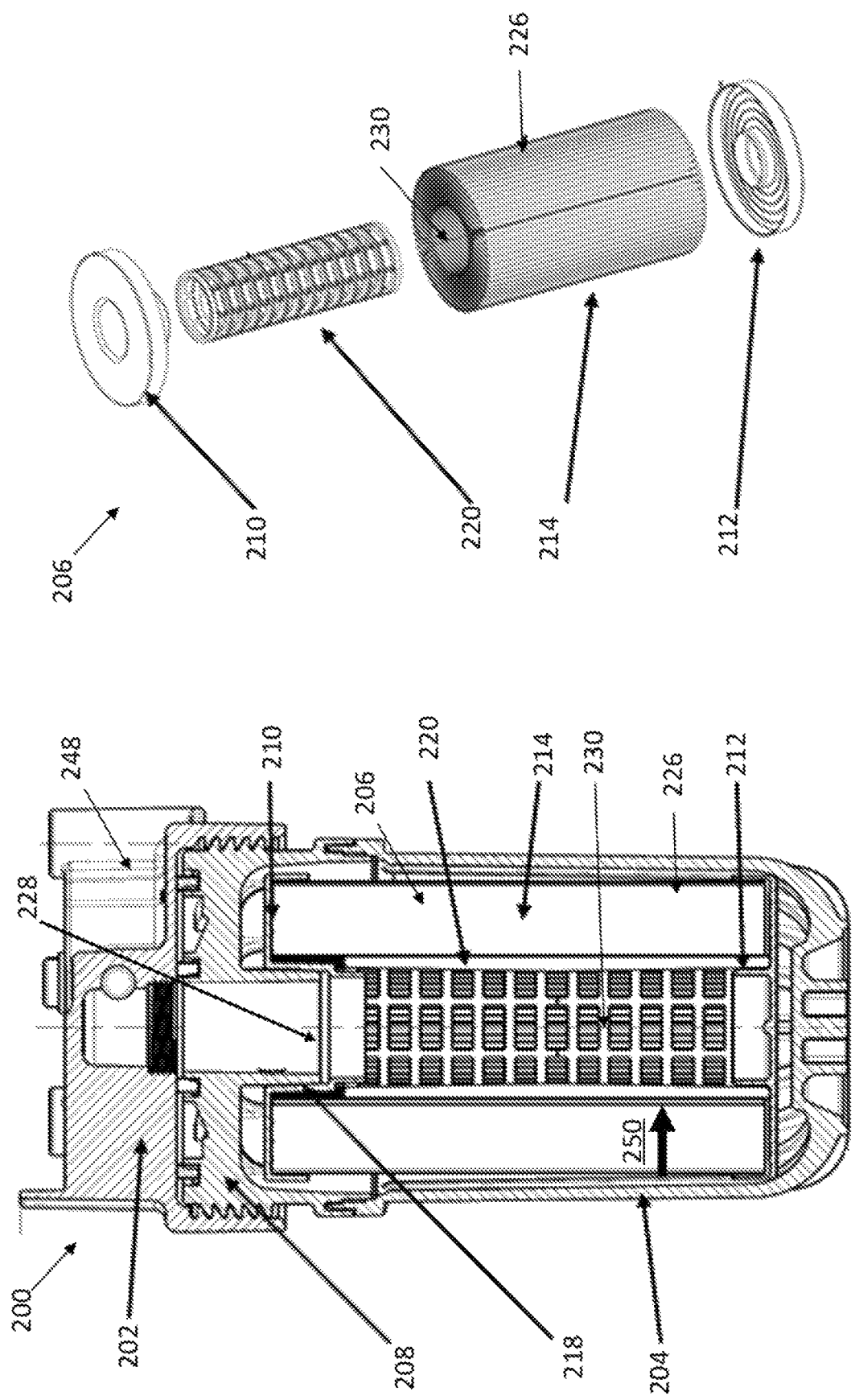
FIG. 2A is a cross-sectional view of a filtration system that includes a filter element with a self-contained electrostatic buildup protection, according to an example embodiment.
FIG. 2B is an exploded view of the filter element of the filtration system of FIG. 2A.
Figure 2C:
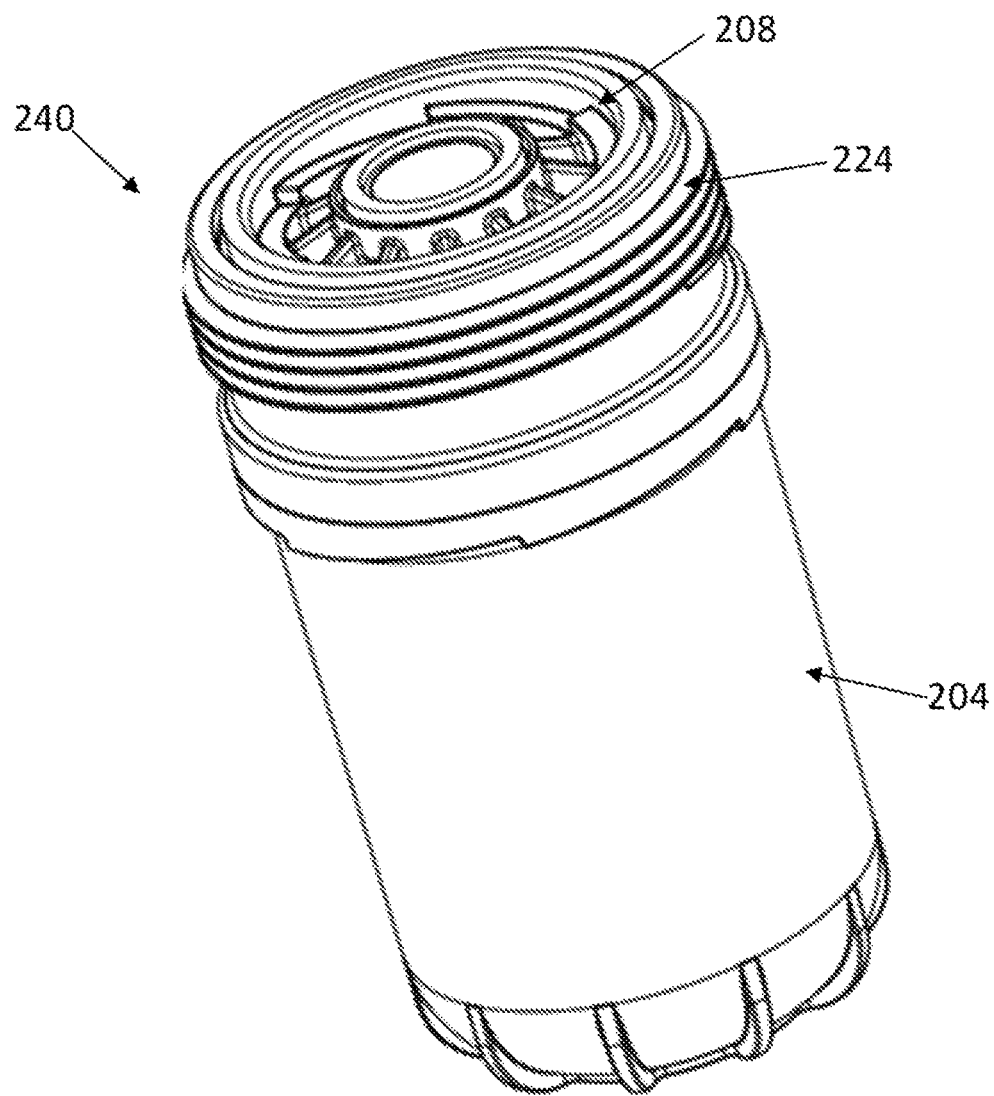
FIG. 2C is a perspective view of a filter cartridge of the filtration system of FIG. 2A.

Referring to FIGS. 2A-2C, a filtration system 200 that includes a filter element 206 with a self-contained electrostatic buildup and ESD protection in a cost-effective manner is shown, according to an example embodiment. The filtration system 200 shown in FIG. 2A includes a filter head 202, a non-conductive filter housing 204, a non-conductive nutplate 208, and a filter element 206 disposed within a cavity of the non-conductive filter housing 204. The filter head 202 is threadingly engaged to the non-conductive nutplate 208. In some embodiments, the filter head 202 is a metal filter head; in other embodiments, the filter head 202 is a non-metallic filter head. The filter head 202 is connected to chassis ground. The filter element 206 includes a first conductive endcap 210, a second conductive endcap 212, filter media 214, and a conductive centertube/support element 220. The second conductive endcap 212 is disposed axially away from the first conductive endcap 210. The filter media 214 extends axially between the first conductive endcap 210 and the second conductive endcap 212. The filter media 214 includes a filter media surface 226 and a central portion 230 disposed radially inward from and downstream of the filter media surface 226. The conductive centertube 220 is disposed within the central portion 230 of the filter media 214. In other words, the centertube 220 is between the center of the central portion 230 (e.g., upstream of the central portion 230) and the filter media 214 (e.g., downstream of the filter media 214). In an outside-in filtration configuration, the fluid flows 250 through the filter media 214 toward the conductive centertube 220. The fluid flows 250 through the central portion 230 of the filter media out an opening 228 in the first conductive endcap 210 towards an outlet 248 in the filter head 202. The non-conductive nutplate 208 is configured to form a seal 218 with the first conductive endcap 210.

While the type of components in the filtration system 200 are similar to the type of components in the filtration system 100, the filtration system 200 implements: a filter housing 204 that is non-conductive and polymeric (or similar non-conductive material); a nutplate 208 that is non-conductive and polymeric (or similar non-conductive material); a centertube 220 that is conductive and polymeric (or similar conductive material); a first endcap 210 and second endcap 212 that are conductive and polymeric (or similar conductive material); and a filter element 206 that is electrically isolated from the filter head 202 and engine such that the filter element is not grounded to the chassis and instead relies on local ground within the filter element. In some embodiments, the filter housing 204 is an insulating shell or housing. In some embodiments, at least one of the centertube 220, the first endcap 210, and the second endcap 212 is nylon or acetal with carbon fiber. In some embodiments, the filter head 202 is a non-conductive material (e.g., polymeric, ceramic, etc.).

The filtration system 200 is configured to control (e.g., eliminate or significantly reduce) ESD by local grounding by shunting opposing charges within the filter element 206 and not through ground chassis. Generally, the filter media surface 226 is a first pole (e.g., charge center) and downstream of the filter media surface 226 the downstream counterions are a second, opposing, pole. As used herein, "pole" refers to the area where charge of one type (e.g., positive or negative) accumulates. For example, the pole may be along a surface of the fibers of the filter media. In some embodiments, an electric circuit is formed between a first pole formed by conductance along a surface of filter media fiber and a second pole formed by counterions downstream of the surface of filter media fiber. The conductive centertube 220 and optional first conductive endcap 210 and optional second conductive endcap 212 provide an electrical connection between the opposing poles eliminating voltage build up. Accordingly, the need for additional metal components to create a chassis ground are avoided.

Turning to FIG. 2B, an exploded view of the filter element 206 is shown. Compared to the filter media 214, the centertube 220, the first conductive endcap 210, and the second conductive endcap 212 have a lower surface area. Accordingly, the conduction of electricity through the surface of the centertube 220, the first conductive endcap 210, and the second conductive endcap 212 is low, thus the electrical resistivity of the material used for the construction is important. In some embodiments, the centertube 220 is constructed of a material with an electrical resistivity of less than $10^5$ Ω·m in direct electrical contact with the filter media 214. For example, the centertube 220 may include nylon 6,6 with greater than 5% carbon fiber by mass. The electrical contact may be established by the filter media 214 pleat tips in direct physical contact with the centertube 220 with or without an electrically conductive intermediary (e.g., metal mesh). In other embodiments, the filter element 206 includes one or more endcaps constructed of material with an electrical resistivity of less than $10^5$ Ω·m that is in contact with an end of the filter media 214. In other embodiments, the conductive centertube 220 and one or both endcaps are in electrical contact with one another and with the filter media 214.

The filter media 214 serves the function of contaminant capture and removal. The filter media 214 may comprise a pleated sheet of porous, fibrous material with properties appropriate for the contaminant removal, pressure drop and life requirements of the filtration system. In some embodiments, a filter media 214 that has a large surface area per unit mass and a surface conductance in low conductivity liquids sufficient to control ESD. Surface conductance may result from the adsorption of surfactants and other polar or ionizable species onto the surface of the filter media fibers. In the case of polymeric filter media, surface conductance is greater than the conductivity (e.g., inverse of resistivity) of the base material. This property indicates that non-conductive polymeric filter media exhibits sufficiently low resistivity in liquids to be used to control ESD. The surface conductance of the filter media 214 enables electrical contact among the filter media 214, the centertube 220, the first endcap 210, the second endcap 212, and the surface conductance balances out the distribution of electric charge within the filter media pleat pack. In some embodiments, the filter media 214 is a polymeric filter media with nylon 6,6 and polyester with a resistivity two to six orders of magnitude greater than the conductive materials used for the centertube 220. In other embodiments, the filter media 214 is a polymeric filter media with nylon. In still other embodiments, the filter media 214 is a polymeric filter media with polyester.

As noted earlier, the filter media surface 226 possesses an electrical charge which leads to an observable streaming potential under flowing conditions. Thus, while the filter media surface 226 is an area where charge is accumulated, it is not essential that the filter media be conductive. While conductive filter media has been used to inhibit ESD, conductive filter media is more expensive than conventional filter media, may not provide the required contaminant removal properties for high performance diesel fuel and hydraulic applications, and implement (e.g., connection with) a chassis ground to impede ESD. Not requiring the utilization of conductive filter media is unexpected in view of current filtration systems, as applications in aviation, engine fuel, and hydraulic application where polymeric filter media is used require a chassis ground to prevent ESD in the polymeric media.

The conductive centertube 220 is structured to generate the conductive path between the liquid borne counterions and the surface charge. Filtered liquid downstream of the filter media 214 carries the counterions that give rise to ESD. The fluid flows 250 through and contacts the centertube 220 as it exits the filter element 206 through the opening 228. Since the centertube 220 is in electrical contact with the filter media surface 226, typically at the pleat tips, the filter media 214 touching the conductive centertube 220 establishes a conductive path to balance any charge imbalance resulting from streaming potential. In some embodiments, the centertube 220 comprises a material with electrical resistivity of less than $10^5$ Ω·m—such as nylon 6,6—with greater than 5% carbon fiber by mass and is in direct electrical contact with the filter media 214. Additionally, in some embodiments, the centertube 220 provides structural support downstream of the filter media 214 during flowing conditions, preventing pleat collapse during high pressure operation. In cylindrical filter elements, the centertube 220 may have circular or oval cross-sections with perforations or other openings along its length to facilitate passage of the fluid through the centertube 220. In rectangular filter elements, the centertube function may be a frame structure with a mesh or grid-like face to facilitate passage of flow.

The first conductive endcap 210 and the second conductive endcap 212 define the ends of the filter element and prevent bypass and mixing of contaminated and clean fluid. In some embodiments, the first conductive endcap 210 and second conductive endcap 212 are polymeric material (e.g., nylon 6,6 or acetal) into which an end of the filter media 214 is thermally embedded, respectively. In other embodiments, either the first conductive endcap 210 or the second conductive endcap 212 may be a cover for the end of the filter media 214 that holds an adhesive potting material (e.g., epoxy or polyurethane) that is used to bond the ends of the filter media to the first conductive endcap 210 and/or second conductive endcap 212. In some embodiments, the first conductive endcap 210 and/or second conductive endcap 212 is an end cap and adhesive material with the filter media 214 potted into it. As shown in FIGS. 2A-2C, the first conductive endcap 210 is an open endcap through which filtered fluid flows through and the second conductive endcap 212 is a closed endcap. In some embodiments, both endcaps are open endcaps. In some embodiments, the first conductive endcap 210 and the second conductive endcap 212 define a rectangular filter element.

As will be appreciated, one or both of the first conductive endcap 210 and the second conductive endcap 212 are optionally conductive. When either the first conductive endcap 210 or the second conductive endcap 212 are conductive, the endcap is in contact with the surface of the filter media 214 and in electrical contact with the filter media 214 across the cross section of the pleat pack. In those embodiments, the conductive endcap serves to balance any charge imbalance radially and circumferentially. Further, through contact with the centertube, the endcaps provide an additional conductive path between the filter media surface 226 and fluid-borne (e.g., liquid-borne) counterions. Beneficially, this reduces the total effective resistance between the fluid-borne counterions and filter media surface 226, thereby further reducing the potential for ESD. Additionally, in some applications, a portion of the streaming current passing from the centertube 220 flows through the conductive endcap(s) as well as through the pleat tips of the filter media 214, thereby limiting current passing through the pleat tips that could damage filter media 214 at the pleat tips.

The non-conductive nutplate 208 is configured to form the seal 218 with the first conductive endcap 210. One or more seals may be formed within the filtration system to isolate the clean (e.g., filtered) and dirty (e.g., unfiltered) sides of the filter element 206 upon installation of the filter element 206 in the filter housing 204. The seal 218 and additional seals may be axial or radial seals and may be formed by a seal member. As will be appreciated, the seals and/or seal members are not essential to forming the conductive pathway to local ground within the filter element 206 as the seals are adjacent to, but not located along, the electrical pathway between the filter media surface 226 and downstream counterions.

Figure 3:
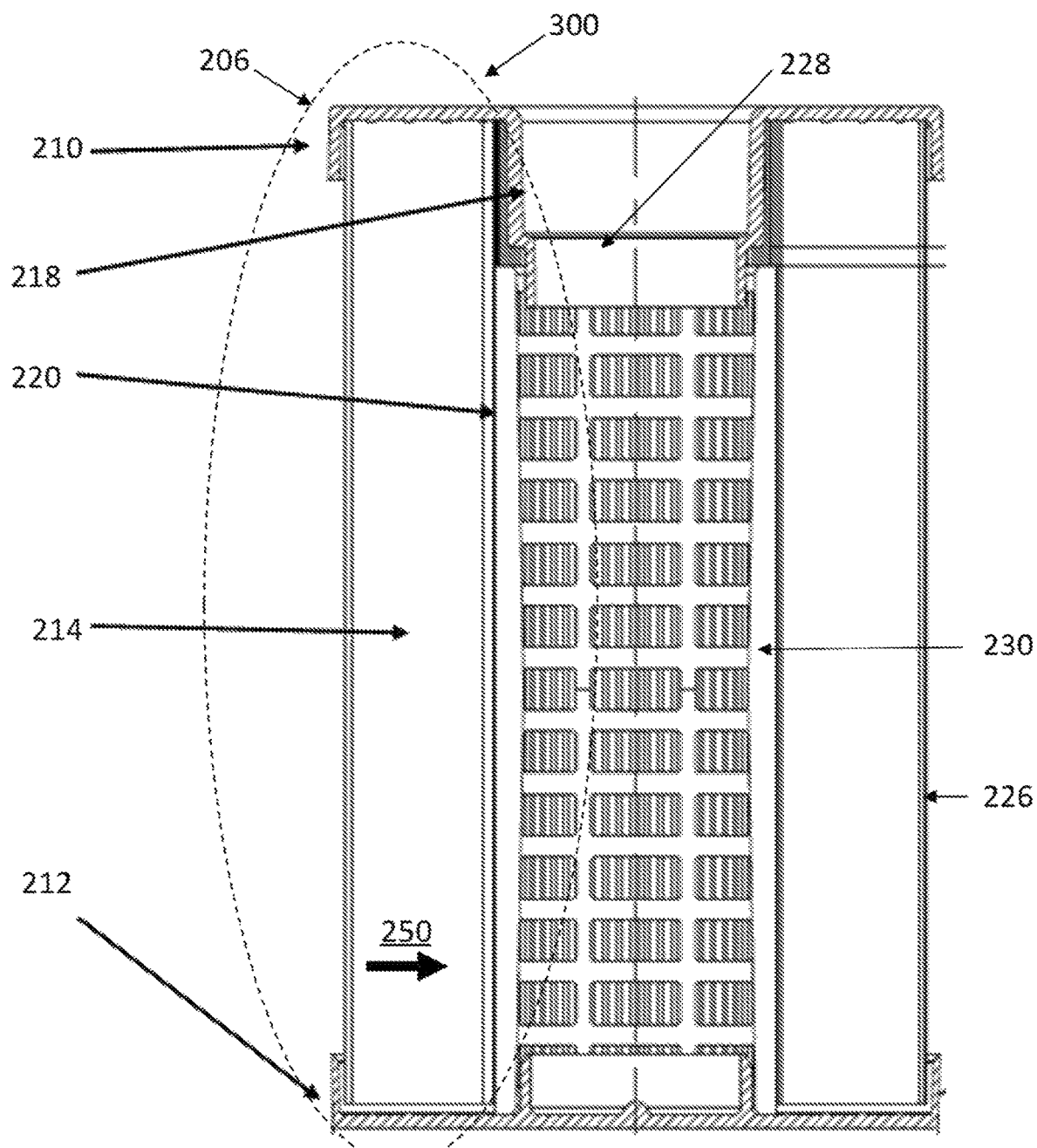
FIG. 3 is a cross-sectional view of the filter element of FIG. 2B in an assembled state.

FIG. 3 shows a cross-sectional side view of the assembled filter element 206 of FIGS. 2A-2C. The filter element 206 is structured to provide a conductive pathway between downstream counterions in the fluid and the oppositely charged filter media surface 226 without the use of a conductive fluid, metal nutplate and/or metal housing, or ground chassis. As will be appreciated, components required to create the conductive pathway may also serve functions essential to the operation of the filter to eliminate the need for additional components in the filter element 206. Beneficially, the filter element 206 of the filtration system can impeded ESD without needing additional components (compared to conventional filtration systems as shown in FIG. 1). When the filter element 206 is used with a system possessing a chassis ground, the local ground of the filter element 206 provides a "backup ground" to prevent ESD in event that the conductive path to chassis ground is broken. The spatial and geometric relationship among the filter element components, as shown in FIG. 3, are such to ensure that the conductive path is robust. Further, the electrical resistivity of these components along the conductive path is sufficient to establish the conductive path.

In some embodiments, the centertube 220 is in electrical contact with the downstream side of the filter media 214. In other words, the pleat tips of the filter media 214 are in physical contact with the centertube 220. In other embodiments, a conductive mesh or screen supporting the downstream side of the filter media 214 may be used. In some embodiments, the centertube 220 and the filter media 214 have similar lengths. In other embodiments, the centertube 220 and filter media 214 have differences in length less than 25%, 10% or 5%. In some embodiments, the centertube 220 and the first conductive endcap 210 or the second conductive endcap 212 are electrically in contact with one another. For the filter element 206, only the filter components (or substructures) required to establish the conductive path (described in greater detail below) are required to be conductive.

Figure 4:
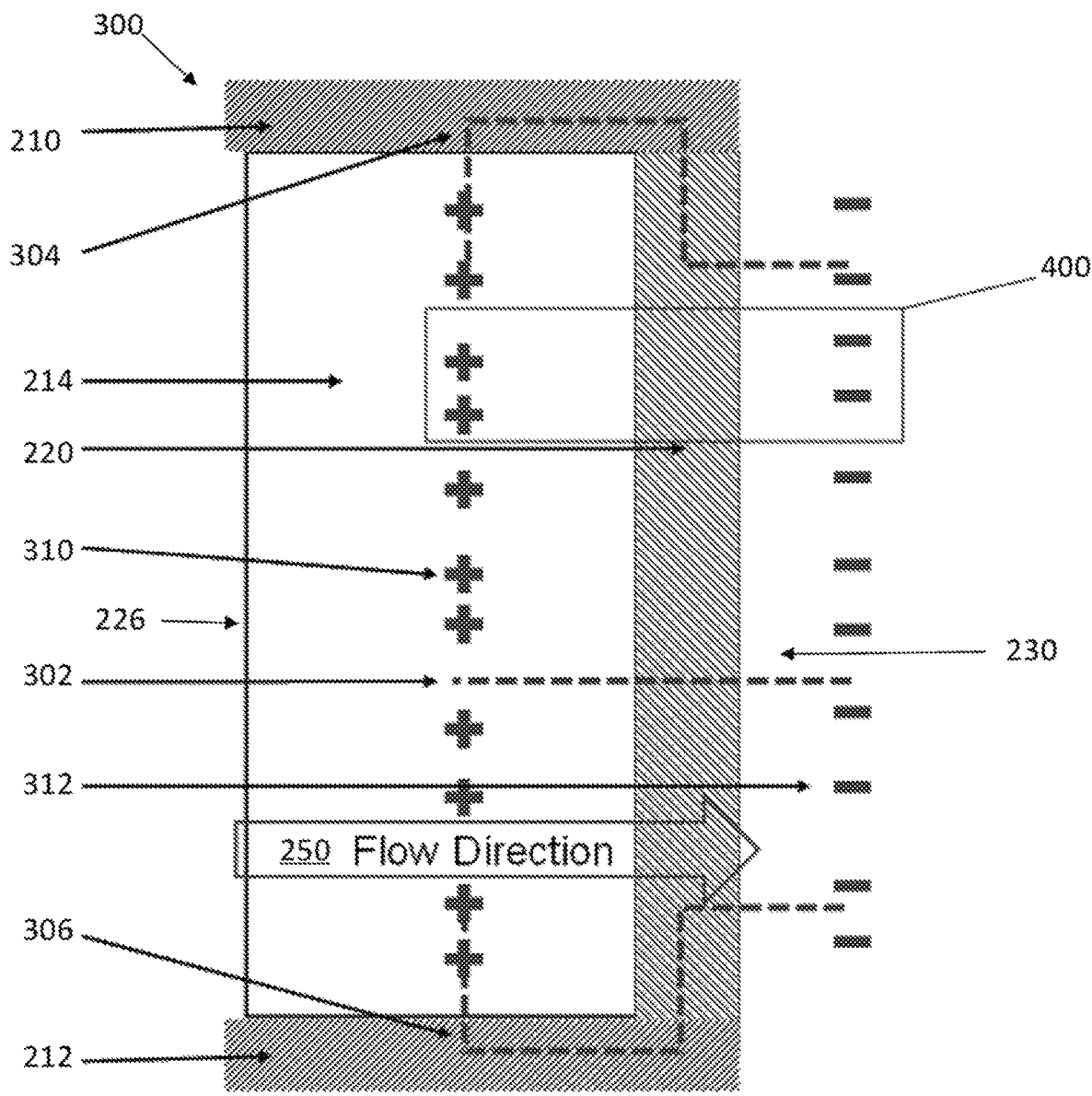
FIG. 4 is a cross-sectional schematic view of a portion of the filter element of FIG. 3.

FIG. 4 shows a portion 300 of the filter element 206 of FIG. 3. FIG. 4 schematically illustrates the various conductive paths whereby charge is transferred within the filter element 206 back to the charged filter media surface 226. As shown in FIG. 4, the charge of the filter media surface 226 of the filter media fibers 310 is positive and the fluid-borne counterions 312 are negatively charged. As shown, the first conductive path 302 (e.g., primary conductive path) for the filter element 206 is from the downstream counterions 312 to the conductive centertube 220 to the filter media surface 226. A second conductive path 304 and a third conductive path 306 (e.g., secondary conductive paths) path exists within the first conductive endcap 210 and the second conductive endcap 212 in contact with the centertube 220. As shown in FIG. 4, the second conductive path 304 and/or third conductive path 306 electricity is conducted from the counterions to the centertube 220 through an endcap to the filter media surface 226. Both conductive paths provide direct shunts of electricity within the filter element 206 and do not rely on chassis ground to prevent charge accumulation and ESD.

Figure 5:
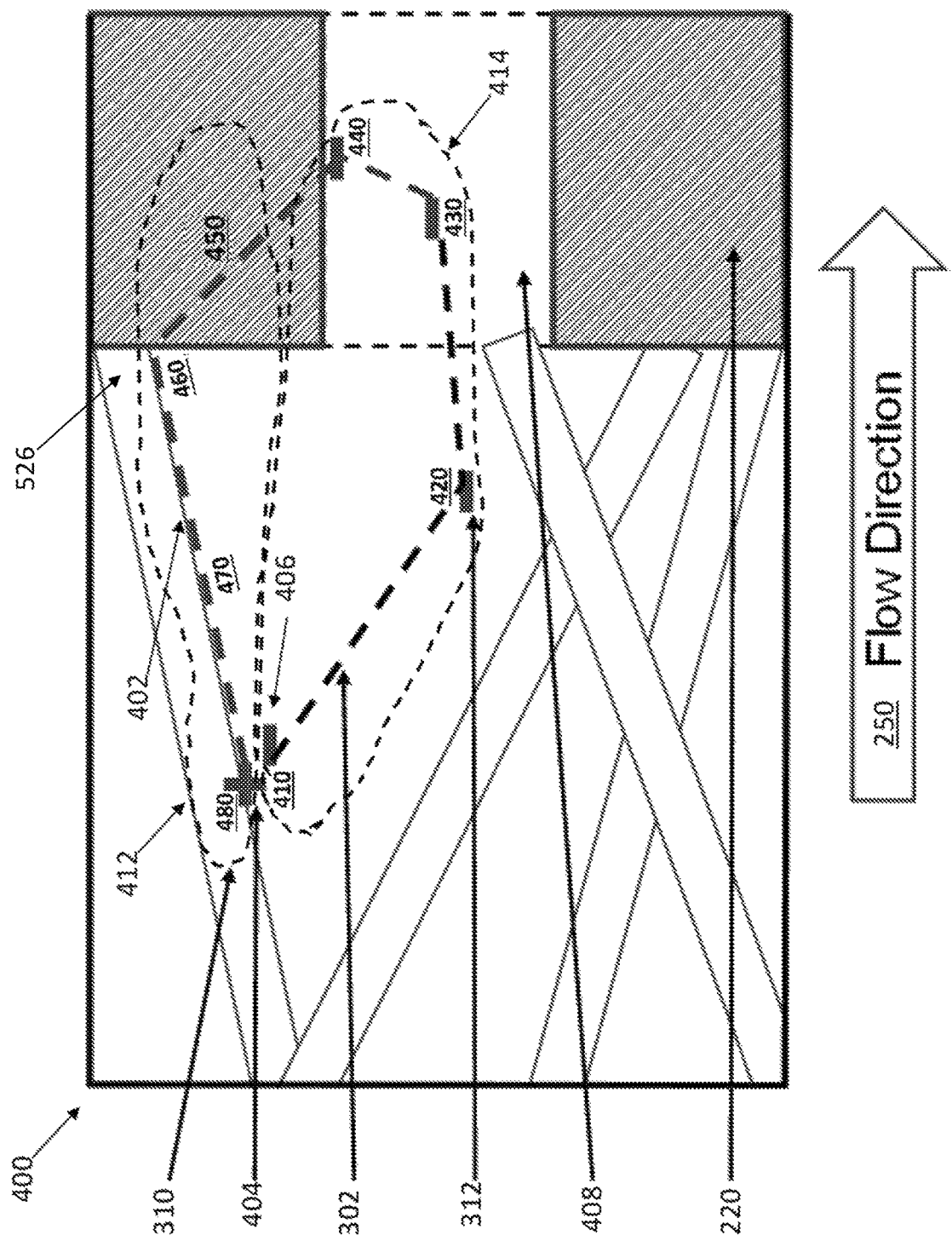
FIG. 5 is a cross-sectional schematic view of conductive path through a portion of the filter element of FIG. 4.

FIG. 5 shows a magnified view a portion 400 of the filter element 206 of FIG. 3. The circuit 402 is formed by the positive charge 404 along the surface 526 of the filter media fibers 310 and the movement and location of the negative charge 406 counterions 312. An opening 408 of the centertube 220 is shown. The circuit 402 is formed by the movement and placement of the positive charge 404 on the filter media fibers 310 and negative charge 406 counterions 312. In other words, the flow 414 of the negative charge 406 counterions 312 downstream is neutralized by the transfer 412 of an electron toward the positive charge 404 on the surface of the filter media fibers 310. The surface of the filter media fibers 310 have conductance and at least a portion of the filter media fibers 310 are in contact with the centertube 220. At location 410, the positive charge 404 on the filter media fibers 310 is being counterbalanced by the negative charge 406 in the counterions 312 in the electrical double layer of the fluid (e.g., liquid) resulting in localized electroneutrality.

When fluid flows 250 through the filter media 214, the counterions 312 are swept from the electrical double layer adjacent the surface of the filter media fibers 310 downstream to location 420. The counterions 312 exit the filter media 214 in the opening 408 (or channel) in the centertube 220 to location 430. At location 440, the counterions 312 are attracted to the conductive centertube 220 causing a charge transfer to occur. In some embodiments, the charge transfer is a transfer of an electron from the counterions, resulting in the ions transitioning into a molecule. As shown in FIG. 5, the flow 414 of the negative charge 406 counterions 312 downstream includes the movement from location 410 toward location 440, by way of location 420 and 430. The flow 414 of the negative charge 406 counterions 312 downstream may travel along a wide range of paths downstream toward the centertube 220.

At location 450, the charge (e.g., electrons) is being conducted within the conductive centertube 220 to the interface between the conductive centertube 220 and filter media 214. At location 460, a transfer of charge from the conductive centertube 220 to the surface of the filter media fibers 310 occurs when the conductive centertube 220 to the surface of the filter media fibers 310 are in contact. The charge is conducted along the surface of the filter media fibers 310 along location 470 until the electrons are transferred to the positively charged location on the filter media 214 at location 480, thereby completing the electric circuit 402. As shown in FIG. 5, the transfer 412 of the electron toward the positive charge 404 on the filter media fibers 310 may move along the centertube 220 and along the surface of the filter media fibers 310 from location 450 toward location 480, by way of location 460 and 470. The transfer 412 of the electron toward the positive charge 404 on the filter media fibers 310 may travel along a wide range of paths downstream toward the centertube 220.

Figure 6:
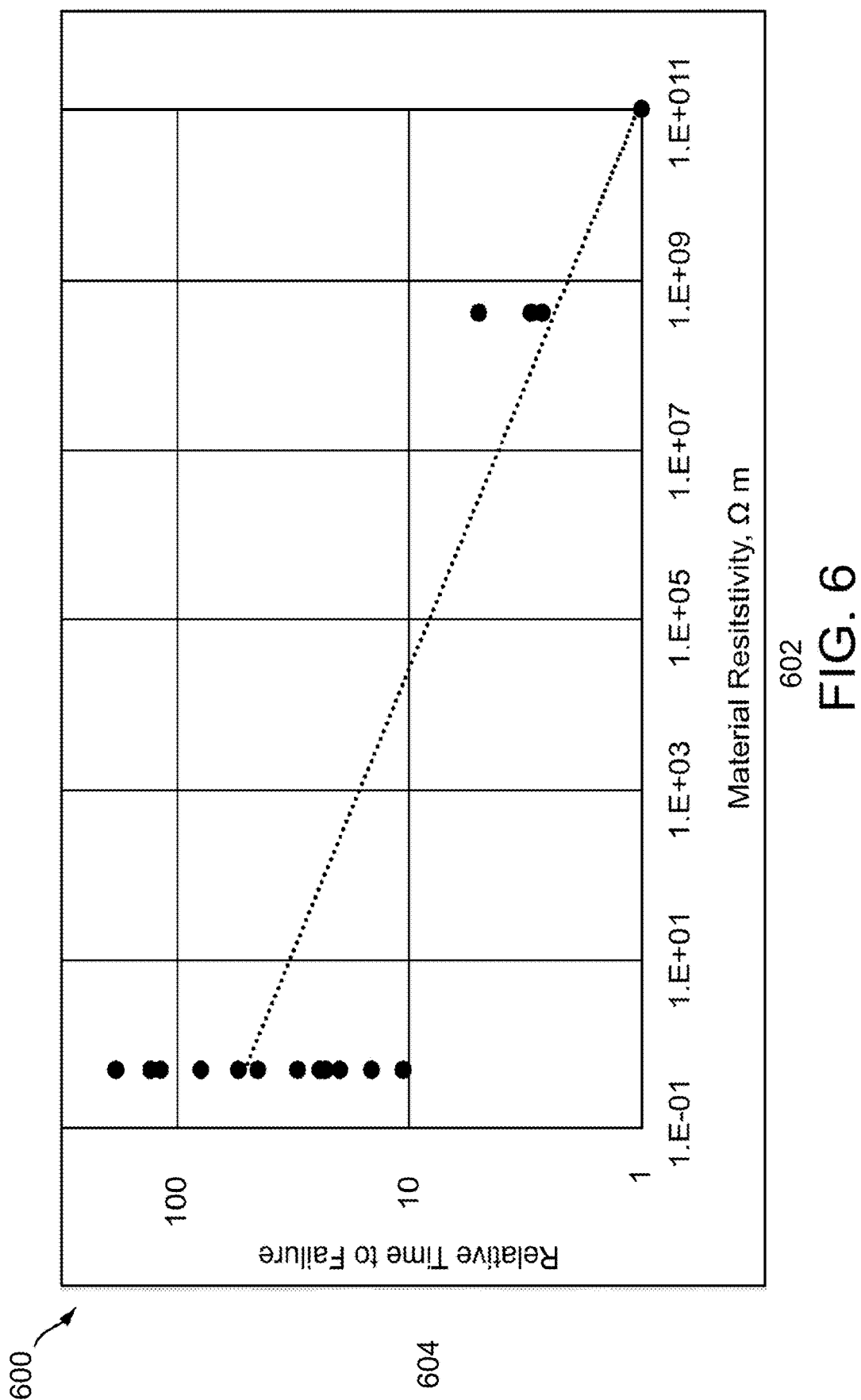
FIG. 6 is a graphical representation of the relative time to failure as a function of material resistivity of a filtration system that includes a filter element with a self-contained electrostatic buildup protection, according to an example embodiment.

Turning to FIG. 6, a graphical view 600 of the relationship between material resistivity 602 ($\Omega \cdot m$) and relative time to failure 604 under controlled conditions is shown, according to an example embodiment. The graphical view 600 may be generated testing ESD and other aspects of the filtration system 200 of FIGS. 2A-5. Material resistivity 602 is determined by measuring the resistance per unit thickness across a sample of the material used for the endcaps (used herein to refer to the first conductive endcap 210 and the second conductive endcap 212) and centertube 220, and multiplying it by the cross-sectional area of the sample. Filter elements 206, as shown in FIGS. 2A-5, were constructed using materials with various resistivities for the endcaps and centertube 220. The centertube 220 and endcaps were made of the same material for each test. Material resistivity 602 was varied by controlling the mass percentage of carbon fiber in nylon 6,6 endcaps. The filter media 214 was potted in epoxy to bond it to the endcaps. The same high resistivity ($>10^{10}$ $\Omega \cdot m$) materials were used for the filter housing 204, the nutplate 208, and seal(s) 218 in all tests. This ensures that the filter element 206 is electrically isolated from the other components in the system (e.g., chassis, external ground, etc.) during testing. To conduct a test, flow 250 of a transformer oil at a temperature of 25° C. in a dry air environment was initiated and continued until the filter failed. The filter element 206 was electrically isolated from all external grounding means. Failure was indicated by visual observation of oil weeping from the filter element 206. The time to failure was measured and divided by the corresponding time obtained for an identical reference filter element made with endcaps and a centertube 220 having a material resistivity of $10^{11}$ $\Omega \cdot m$ to obtain the Relative Time to Failure 604. A Relative Time to Failure 604 of ten or greater was considered satisfactory. Ten was selected to correspond to a roughly ten-fold increase in filter life of the filter element 206.

As shown in FIG. 6, a material resistivity 602 for the endcap/endcaps and centertubes 220 of less than $10^5$ $\Omega \cdot m$ is required to control ESD to acceptable levels. For reference, metal, such as is used in prior art filters to establish chassis ground, has a resistivity on the order of $10^{-8}$ $\Omega \cdot m$. At resistivities higher than $10^5$ $\Omega \cdot m$, electrostatic buildup and failure of the filter occurred at unacceptably short periods of time. This demonstrates that ESD can be controlled using centertubes 220 and (optionally) endcaps normally not considered to be good electrical conductors, even when filter shells and nutplates that are electrical insulators isolate the filter element 206 from chassis ground. Beneficially, the filter element 206 of the filtration system 200 reduces filter failures due to ESD, simplifies ESD control by using lower cost conductive polymeric components to establish local ground, and retains the other benefits that accompany the use of plastic filter components. In certain applications, it is desirable to avoid metal components to reduce cost or weight and to facilitate manufacturing and production.

While FIGS. 2A-5 is shown as a spin-on filter cartridge 240, the systems and methods of the filter element 206 with a self-contained electrostatic buildup and ESD protection in a cost-effective manner may be implemented with filter elements and filter cartridges installed in a wide variety of filtration systems regardless of the design and materials used for the filter housing, filter head, filtration module, covers, and other components. Additionally, while the filter cartridge 240 is shown as cylindrical in shape, a wide variety of filter cartridge shapes may be used, for example, rectangular, oval, racetrack filter elements, etc. Other components may also be part of the filter, providing additional functionality, e.g., serving to guide installation, ensuring that a proper filter is used, detecting filter condition, enabling fluid to bypass the filter during extreme pressure conditions, may be implemented with the filtration system 200. Finally, while the self-contained electrostatic buildup and ESD protection is described above with respect to a filter element, other components for filtration systems may be used to implement a self-contained electrostatic buildup and ESD protection for a filtration system.

The filter media 214 may include any of pleated media, corrugated media, tetrahedral media, or variations thereof. U.S. Pat. No. 8,397,920, entitled "PLEATED FILTER ELEMENT WITH TAPERING BEND LINES," by Moy et al., filed on Oct. 14, 2011, and issued on Mar. 19, 2013, assigned to Cummins Filtration IP Inc., which is incorporated by reference in its entirety and for all purposes, describes an example tetrahedral filter media. Some configurations of tetrahedral filter media include a plurality of inlet tetrahedron flow channels and a plurality of outlet tetrahedron flow channels. The inlet tetrahedron merge in a central portion of the filter material, thereby allowing axial cross-flow of air between the inlet tetrahedron channels prior to the air passing through the filter media. Such an arrangement provides for additional dust loading on the upstream side of the media, which increases filter capacity. The tetrahedral flow channels may be stacked, layered, or coiled into various shapes and configurations. For example, the filter media 214 may have, for example, thirty to eighty stacked layers of tetrahedral flow channels. These stacked layers of tetrahedral flow channels can be arranged to form various shapes. Specific arrangements of such tetrahedral filter media are further described in U.S. Pat. No. 8,397,920.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, unless otherwise noted, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter element comprising:
   a first endcap;
   a second endcap disposed axially away from the first endcap;
   filter media extending axially between the first endcap and the second endcap, the filter media comprising a filter media surface, a central opening is defined within the filter media, the central opening is disposed radially inward from the filter media surface;
   a support element disposed within the central opening, the support element in contact with the filter media, the support element being conductive;
   a first pole formed by conductance along the filter media surface, the first pole having a first charge; and
   a second pole formed by counterions downstream of the filter media surface, the second pole having a second charge, the first charge opposite in charge to the second charge,
   wherein the support element and the filter media surface form a first conductive path from the counterions to the support element to the filter media surface, causing a charge transfer to occur at the support element, and
   wherein the support element, the filter media surface, and at least one of the first endcap or the second endcap form a second conductive path from the counterions to the support element through the at least one of the first endcap or the second endcap to the filter media surface.

2. The filter element of claim 1, wherein the filter media is non-conductive.

3. The filter element of claim 1, wherein at least one of the support element and first endcap is polymeric.

4. The filter element of claim 1, wherein at least one of the support element and first endcap is a non-conductive material with a material resistivity greater than 1010 Ω·m.

5. The filter element of claim 1, wherein one of the first endcap or the second endcap is a non-conductive material with a material resistivity greater than 1010 Ω·m.

6. The filter element of claim 1, wherein the support element comprises a plurality of perforations configured to facilitate passage of fluid through the support element.

7. A filter element comprising:
   a first endcap;
   a second endcap disposed axially away from the first endcap;
   filter media extending axially between the first endcap and the second endcap, the filter media comprising a filter media surface, a central opening is defined within the filter media, the central opening is disposed radially inward from the filter media surface;

a support element disposed within the central opening, the support element being conductive;

a conductive mesh disposed within the central opening between the support element and the filter media, the conductive mesh in contact with the support element and the filter media;

a first pole formed by conductance along a filter media surface, the first pole having a first charge; and a second pole formed by counterions downstream of the filter media surface, the second pole having a second charge, the first charge opposite in charge to the second charge, wherein the conductive mesh, the support element, and the filter media surface form a first conductive path from the counterions to the support element to the conductive mesh to the filter media surface, causing a charge transfer to occur at the support element, and wherein the conductive mesh, the support element, the filter media surface, and at least one of the first endcap or the second endcap are in electrical contact and form a second conductive path from the counterions to the support element through the conductive mesh and the at least one of the first endcap or the second endcap.

8. The filter element of claim 7, wherein the first charge of the first pole is positively charged and the second charge of the second pole is negatively charged.

9. The filter element of claim 7, wherein the support element comprises a plurality of perforations configured to facilitate passage of fluid through the support element.

\* \* \* \* \*